United States Patent [19]
Chase

[11] 3,789,518
[45] Feb. 5, 1974

[54] SIMULATED HUMAN LIMB
[75] Inventor: Myron C. Chase, Red Wing, Minn.
[73] Assignee: Weatherby/Nasco, Inc., Fort Atkinson, Wis.
[22] Filed: Apr. 12, 1972
[21] Appl. No.: 243,353

[52] U.S. Cl. .................................. 35/17, 264/222
[51] Int. Cl. ........................................ G09b 23/34
[58] Field of Search ... 35/17; 156/57; 264/222, 223; 152/347

[56] References Cited
UNITED STATES PATENTS

| | | | |
|---|---|---|---|
| 1,507,646 | 9/1924 | Wildman | 152/347 |
| 2,324,702 | 7/1943 | Hoffmann | 35/17 |
| 2,689,415 | 9/1954 | Haver | 35/17 |
| 2,704,897 | 3/1955 | Lade | 35/17 |
| 2,871,579 | 2/1959 | Niiranen et al. | 35/17 |
| 2,871,584 | 2/1959 | Poole | 35/17 |

Primary Examiner—Harland S. Skogquist
Attorney, Agent, or Firm—Parker, Plyer & McEachran

[57] ABSTRACT

An anatomical part simulacrum wherein a core is enclosed within a skinlike glove and the method of forming the simulacrum by separately forming a core and a glovelike element and thereafter applying the element to the core.

6 Claims, 5 Drawing Figures

3,789,518

SIMULATED HUMAN LIMB

SUMMARY OF THE INVENTION

This invention relates to teaching aids and particularly to an improved device for training doctors, nurses and medical technicians.

One purpose of the invention is to provide a teaching aid in the form of a simulated anatomical part having characteristics more nearly identical to its live counterpart than those previously available.

Another purpose is to provide a human limb teaching aid for realistic training in needle insertion, intravenous injection, blood withdrawal and like activities.

Another purpose is to provide a lifelike replica of a human limb, such as an arm or leg, having an appearance, texture, reaction and feel substantially identical to those presented by a live patient.

Another purpose is to provide a human limb replica in which the student may learn to determine the location of veins by touch.

Another purpose is to provide such a replica wherein certain veins within the limb appear darker in the manner of those of a live patient.

Another purpose is to provide a method of forming a more realistic replica of a human limb.

Another purpose is to provide a method of forming a human limb replica which shall exhibit increased realism in appearance, reaction feel and general texture.

Another purpose is to provide a human limb replica having a "skin" capable of being gathered and pinched as in life.

Another purpose is to provide a human limb replica including simulated veins which may be "rolled" beneath a skin-simulating layer.

Another purpose is to provide a human limb replica having a core element simulating muscle, bone and veins and a glovelike or bootlike configuration simulating skin wherein the core element and said configuration can be easily separated for replacement or repair without damage to either.

Other purposes may appear from time to time during the course of the specification and claims.

BRIEF DESCRIPTION OF THE DISCLOSURE

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
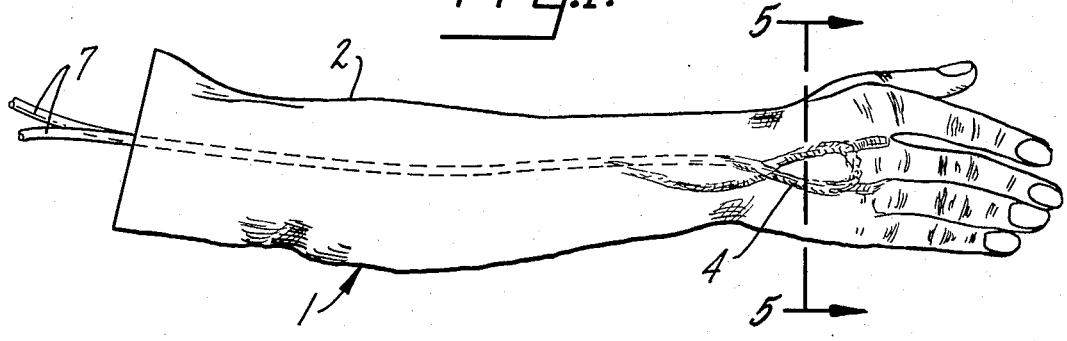
FIG. 1 is a top plan view of the invention.

Referring now to the drawings, and particularly to FIG. 1, it will be observed that the replica of the invention is illustrated as a human arm. It will be understood by those skilled in the art that the inventions disclosed herein may be employed in relation to other parts of an anatomy, hence references to "arm" herein should be taken including such other parts. The arm of FIG. 1 is exceedingly realistic, having a color, texture, feel and reaction to touch, pinching and the like substantially identical to that found in life.

Figure 2:
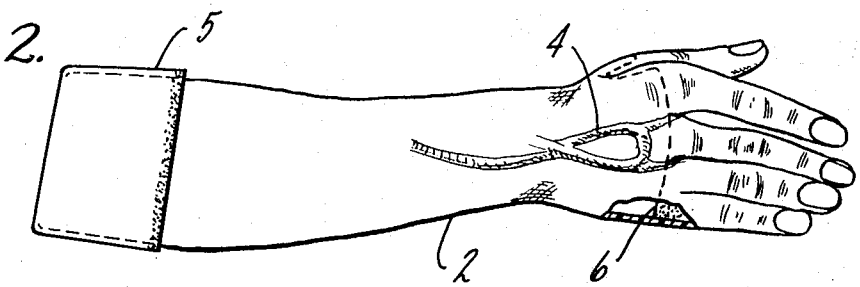
FIG. 2 is a detail view illustrating the glovelike element of the invention.
Figure 3:
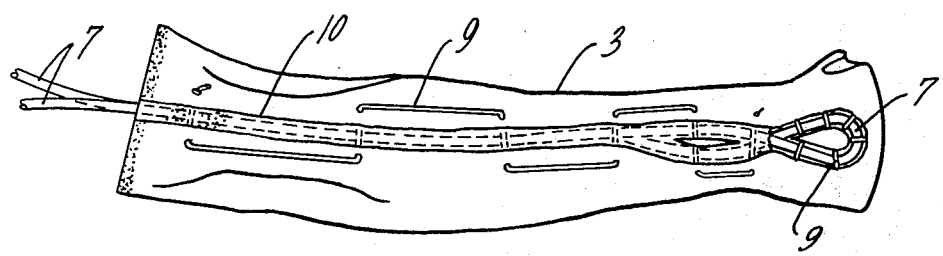
FIG. 3 is a detail view illustrating the core element of the invention.

The arm 1 of FIG. 1 includes a skin element 2 shown in FIG. 2 and a core element 3 shown in FIG. 3. The outer surface of skin element 2 includes ridges 4 identical in appearance and feel to the ridges created in life by veins beneath the skin and as they existed in the human arm employed as a model as described below.

The skin element 2 and core 3 are separately formed in the method of the invention. A first mold (not shown) is formed on a human arm. It has been found preferable to employ a silicone rubber material and to apply it directly to the entire surface of a human arm in forming the mold. The inner surface of the mold is thus formed substantially identically with the surface of the human arm, the detail being so fine as to accurately reproduce the fingerprints of human arm model. The mold is formed in two pieces and when it has set, the pieces are separated to free the human arm.

The mold pieces are then rejoined and polyvinyl chloride of a thin liquid consistency is poured into the mold. The mold is filled with polyvinyl chloride in liquid form, causing the polyvinyl chloride to fill all crevices in the inner surface of the mold.

The mold is then inverted to empty from it virtually all but a layer or coating of polyvinyl chloride adherring to the inner mold surface. It has been found preferable then to set the mold in an upright position with the finger segment thereof pointed downwardly. Some of the polyvinyl chloride adherring to the inner surface of the mold will flow into the finger cavities of the mold. After three or four minutes forced air may be applied to the area within the mold for about five minutes to facilitate drying of the polyvinyl chloride therein.

To insure contact with the entire inner surface of the mold and to provide a coating of desired thickness, the mold may again be filled with polyvinyl chloride in liquid, flowing consistency, the mold being virtually immediately emptied of excess polyvinyl chloride and again set in the normal or fingers-down position. It will be understood that care is exerted to insure against the filling of the finger cavities beyond the desired level and that forced air may again be applied to the area within the mold to expedite cooling and drying of the polyvinyl chloride therein.

The method further includes the application of a vacuum to the area within the closed mold prior to the initial supply of polyvinyl chloride thereto. It has been found preferable to apply such vacuum for a period of at least five minutes. A suitable valve (not shown) is closed after the predetermined period of vacuum application to the area within the mold. A supply of flowable polyvinyl chloride in liquid form is provided at one end of the mold. A small gate valve (not shown) is opened and the polyvinyl chloride promptly and rapidly fills the mold.

The foregoing method steps result in the formation of an elongated "glove" or total, tubular skin layer without seams and having an outer surface identical to that of the human arm originally employed in making the mold.

The skin element has a preferable thickness of about one thirty-second of an inch. The parts of the mold are then separated and the skin element of the invention is set to one side. Illustrated in FIG. 2, the hollow, glovelike skin element may be folded upon itself, as indicated at 5 and rolled down in the manner of a glove.

While, as above indicated, the finger portions may be conveniently filled, the same being intended to facilitate realism, it will be realized that the fingers could be "empty" or hollow if desired. The dotted line 6 in FIG. 2 indicates a filling of the fingers to the base thereof at a convenient level. If the fingers were left empty, the core element 3 could be formed with finger portions adapted to fit therewithin.

The skinlike-simulating element 2 is then itself employed as a mold, being filled with a suitable substance effective to provide a model for later employment in forming the core element 3. Thus the skin element 2 is filled with a nonadherring material which will set up rigidly within the element 2. While a number of such materials may be employed, it has been found preferable to employ a polyurethane foam material in a cold fluid state. When said material has solidified within the element 2, the element 2 is inverted or rolled downwardly off the rigid core thus formed.

Figure 4:
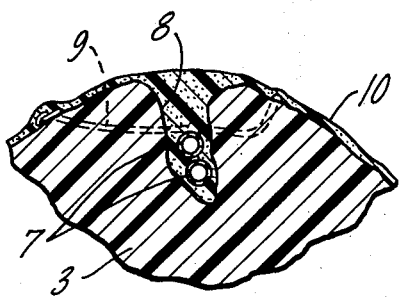
FIG. 4 is a detail view illustrating part of one end of the element of FIG. 3 with a coating added.
Figure 5:
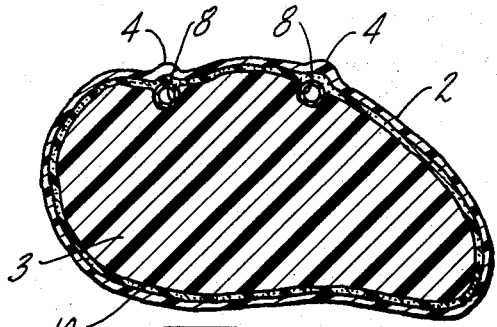
FIG. 5 is a view taken on the line 5—5 of FIG. 1.

Thereafter the rigid core or model (not shown) thus formed is configured to accept the flexible rubberlike vein-simulating tube 7. As shown, for example, in FIGS. 3, 4 and 5, a portion of said model will be slotted or grooved comparatively deeply to enable eventual positioning of two lengths of the core 7 beneath the surface of the core 3. The groove thus formed will be forked and otherwise directed to simulate the path of human veins in a human arm, some portions of the groove being comparatively shallow to cause at least part of the tube 7 to extend above the surface of core 3.

With the core model thus configured, it is itself employed as the means of forming a core mold (not shown). The core mold is formed of the same material and is employed in the same manner as that employed in making the original mold from a human arm described above. The mold is then separated and the core mold is set aside. Thereafter polyvinyl chloride in liquid, flowing consistency, is poured into the core mold to form the core 3. Thus the core 3 will conform identically with the area within element 2 and will bear the grooved configurations of the core model above described.

The core 3 is removed from its mold and the tube 7 is placed within the groove 8 therein. As illustrated in FIG. 3, a thread or stitching 9 may be employed to hold the tube 7 in place. Alternatively, a suitable adhesive may be employed for such purpose.

The core element 3 with the tube 7 held in place is then entirely coated with a coating 10 formed of a suitable material having a tacky, flexible, gel-like consistency. While a variety of materials may be used, having said characteristics, it is found preferable to employ a mixture of polyvinyl chloride and a plasticizer, the ratio of plasticizer to polyvinyl chloride being of the order of three to one. As will be observed in FIG. 4, the coating 10 fills the groove 8 above the tube 7, where the latter is carried beneath the surface or core 3 and since the coating 10 covers the entire core 3, it overlies the portions of tube 7 which rise above the surface of core 3, as may be seen best in FIG. 5.

The material of coating 10 has a self-sealing characteristic whereby needles inserted into the arm of the invention and into tube 7 in the training of medical personnel in the art of drawing blood, intravenous injections, and the like, will not result in leakage, the layer 10 sealing the punctures in tube 7. Thus the self-sealing characteristic of the coating 10 provides also for an extended life of the arm of the invention.

Since the coating 10 is flexible and has a tacky attachment to the elements 2 and 3, the skinlike element 2 may be readily moved on the core 3 without overmovement thereon or separation therefrom precisely in the manner of human skin on a human arm.

Since the adherence of element 2 to element 3, through the mediacy of layer 10, is thus not a rigid or adhesive one, the element 2 may be easily and simply separated from the core 3 by separating the attachment at the rearmost end thereof and rolling element 2 off the core 3, in the manner of a glove, without damage to either the element 2 or the core 3. Thus the two may be separated for repair or replacement with ease and without destruction of either.

The embodiments of the invention in which an exclusive property or privilege is claimed are defined as follows:

1. An anatomical part replica including a core element and a removable glovelike skin element, said core element carrying a vein-simulating tube, at least a portion of said tube rising at least partially above the outer surface of said core element, at least a portion of said tube carried beneath the surface of said core element, said skin element having vein-like configurations rising from its outer surface, said rising tube portions and said configurations being aligned.

2. The structure of claim 1 wherein said skin element is relatively loose upon said core element and said elements are rigidly sealed together only at one end thereof.

3. The structure of claim 1 wherein an elongated portion of said tube lies beneath the external surface of said core element and a shadow-casting material overlies said elongated material beneath said skin element.

4. The structure of claim 1 characterized by and including an intermediate layer between said core element and said skin element, said layer being formed of a flexible, tacky substance having a self-sealing characteristic and effective to retain said skin element movably in place on said core element, said layer being rendable to facilitate removal of said skin element intact from said core element.

5. A medical training aid in the form of a simulated human limb, said limb having a bone and flesh-simulating core element and a removable skin-simulating element, said skin-simulating element being glovelike in overall configuration, and a layer of flexible, tacky, gel-like material between and in contact with said elements.

6. The structure of claim 5 wherein said layer material has a self-sealing characteristic.

* * * * *